US007299984B2

(12) United States Patent
Euchner et al.

(10) Patent No.: US 7,299,984 B2
(45) Date of Patent: Nov. 27, 2007

(54) POSTAGE INDICIA INCLUDING ENCODED INK CHARACTERISTIC DATA

(75) Inventors: James A. Euchner, Waccabuc, NY (US); Judith D. Auslander, Westport, CT (US)

(73) Assignee: Pitney Bowes Inc., Stamford, CT (US)

( * ) Notice: Subject to any disclaimer, the term of this patent is extended or adjusted under 35 U.S.C. 154(b) by 463 days.

(21) Appl. No.: 10/645,376

(22) Filed: Aug. 21, 2003

(65) Prior Publication Data

US 2005/0040234 A1 Feb. 24, 2005

(51) Int. Cl.
*G06K 7/10* (2006.01)
*G06K 7/14* (2006.01)
*G06K 19/06* (2006.01)

(52) U.S. Cl. ................ 235/454; 235/462.01; 235/491; 235/494

(58) Field of Classification Search ................ 235/375, 235/454, 468, 469, 462.01, 491, 494; 705/401, 705/405, 410; 358/1.1
See application file for complete search history.

(56) References Cited

U.S. PATENT DOCUMENTS 4,806,740 A 2/1989 Gold et al.
5,525,798 A 6/1996 Berson et al.
5,867,586 A 2/1999 Liang
5,912,682 A * 6/1999 Parkos ........................ 347/40
5,937,762 A * 8/1999 Herbert ...................... 101/483
5,974,150 A 10/1999 Kaish et al.
6,039,257 A 3/2000 Berson et al.
6,070,805 A 6/2000 Kaufman et al.
6,256,638 B1 7/2001 Dougherty et al.
6,299,274 B1 * 10/2001 Bolash et al. ................ 347/19
6,373,965 B1 * 4/2002 Liang ........................ 382/112
6,502,912 B1 * 1/2003 Bernard et al. ............. 235/491
6,574,000 B1 * 6/2003 Sansone ..................... 358/1.1
6,701,304 B2 * 3/2004 Leon ......................... 705/401
7,128,409 B2 * 10/2006 Steinmetz et al. ............ 347/86
2004/0253419 A1 * 12/2004 Bleikolm et al. ........ 428/195.1
2005/0071295 A1 * 3/2005 Cordery et al. ............. 705/405
2005/0088499 A1 * 4/2005 Jones et al. ................... 347/99
2005/0260021 A1 * 11/2005 Abello ........................ 400/62

FOREIGN PATENT DOCUMENTS

EP 1173001 A2 1/2002
GB 2 376 334 A * 11/2002
WO 97/24699 7/1997
WO 00/65541 11/2000

* cited by examiner

*Primary Examiner*—Jared J. Fureman
(74) *Attorney, Agent, or Firm*—Ronald Reichman; Angelo N. Chaclas

(57) ABSTRACT

The present invention includes apparatus and methods for printing and verifying postage indicia. The indicia includes data that indicates characteristics of ink used to print the indicia. To verify the indicia, the data is read and compared with data provided by detecting optical or related characteristics of the ink.

17 Claims, 6 Drawing Sheets

POSTAGE INDICIA INCLUDING ENCODED INK CHARACTERISTIC DATA

BACKGROUND

This invention relates generally to the field of postal revenue protection, and more particularly to generation and reading of machine-verifiable postage indicia.

Postage meters are well known. An important aspect of any system that includes postage meters is protection of postal revenue and prevention and deterrence of postage indicia counterfeiting. While currently available systems generally operate satisfactorily in this regard, it would be desirable to provide a postage metering system that facilitates automatic inspection and verification of postage indicia.

SUMMARY

Accordingly, apparatus and methods for generating and inspecting machine-verifiable postage indicia are provided.

In one aspect, an apparatus includes a reader that reads first ink characteristic data from an indicia, and a detection mechanism that detects at least one ink characteristic of the indicia to generate second ink characteristic data. The apparatus further includes a processing mechanism that is coupled to the reader and to the detection mechanism and that compares the second ink characteristic data with the first ink characteristic data. The ink characteristic detected by the detection mechanism may include one or more of a color or colors, a spectral characteristic or characteristics, and a luminescence characteristic or characteristics. A single scanner may be shared by both the reader and the detection mechanism. The first ink characteristic data may be encoded as a symbol or symbols that are part of the indicia and are read by the reader.

In another aspect, an apparatus includes a print element for applying ink to a substrate to form an indicia and a processing mechanism that is coupled to the print element for causing the print element to print at least one symbol as part of the indicia. The at least one symbol includes ink characteristic data that is indicative of a characteristic of the ink. The characteristic of the ink indicated by the ink characteristic data may include one or more of a color or colors of the ink employed in forming the indicia, a spectral characteristic or characteristics of the ink, and a luminescence characteristic or characteristics of the ink. The indicia may include a plurality of panels printed in different colors of ink, and the ink characteristic data may indicate the respective colors of each of the panels. The processing mechanism may cause the print element to print the ink characteristic data in encrypted form.

By printing postage indicia with ink having characteristics that vary from indicia to indicia, and encoding in each indicia data that indicates the characteristics of the ink employed for printing the indicia, the invention may make it more difficult to counterfeit postage indicia and may aid in machine inspection and verification of postage indicia.

The indicia may also be placed on personal, business and government documents.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for printing and verifying postage indicia. The indicia may be printed with ink having a particular characteristic or characteristics, such as one or more colors, or particular spectral and/or luminescence characteristics. There is data encoded in the indicia that indicates the characteristic or characteristics of the ink used to print the indicia. To verify the indicia, the ink characteristic or characteristics are detected, and the data encoded in the indicia concerning the ink characteristic or characteristics is read. The detected ink characteristic or characteristics are compared with the data to determine whether there is a match. If so, the authenticity of the indicia may be considered to be verified.

Figure 1:
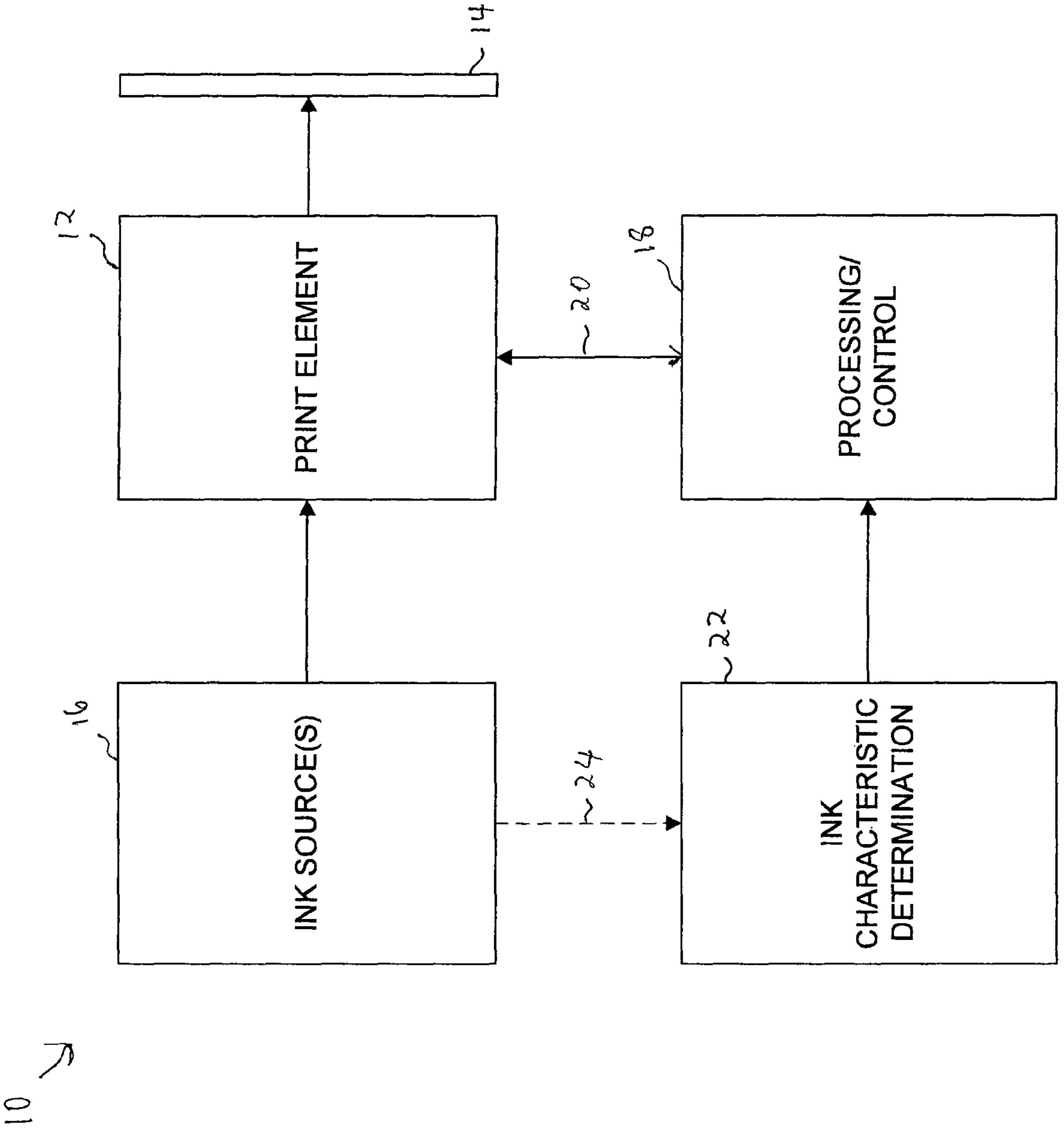
FIG. 1 is a block diagram that illustrates an indicia printing apparatus arranged in accordance with principles of the present invention.

Referring now to the drawings, and particularly to FIG. 1, the reference numeral 10 indicates generally a postage indicia printing apparatus in accordance with principles of the present invention. The printing apparatus 10 includes a print element 12 that is configured to print an indicia (not shown in FIG. 1) on a mailpiece, a label or another type of substrate, indicated by reference numeral 14. In some embodiments, the print element 12 may be a color ink jet printer which is capable of printing a multi-colored indicia using inks of different respective colors from a plurality of ink cartridges (generally indicated by ink source(s) block 16 in the drawing). Alternatively, even if plural ink cartridges of different colors of ink are employed, the print element 12 may be operated to produce an indicia that appears to be monochrome. As another alternative, assuming plural ink cartridges are employed, one or more inks in the respective cartridges may differ from one or more of the other ink or inks only in terms of a luminescence characteristic such as fluorescence or phosphorescence. In other embodiments, the print element may be a printer of the type employed in conventional The printing apparatus 10 also includes a processing and control block 18, which is coupled to and controls the print element 12. The coupling of the processing and control block 18 to the print element 12 may be via a data channel 20. In accordance with conventional practices, the data channel 20 may be secured by encryption performed in the processing and control block 18 and/or the print element 12. In some embodiments, hardware aspects of the processing and control block 18 may be constituted by conventional electronics used to control known types of postage meter, but programmed with software provided in accordance with principles of the present invention. (Program storage and working memory aspects of the processing and control block 18 are not separately shown.)

The printing apparatus 10 also includes an ink characteristic determination block 22 that is coupled to the processing and control block 18. In some embodiments, the ink characteristic determination block 22 may not include any hardware that is separate from the processing and control block 18, but may rather be constituted by hardware shared with the processing and control block software and by software which programs the processing and control block hardware to cause the print element 12 to select a combination of inks from the ink sources 16 to be used in printing a particular indicia. The combination of inks may be changed by the ink characteristic determination block 22 from indicia to indicia. In some embodiments, the various combinations of inks that may be printed by the print element 18 in response to the processing and control block 18 and the ink characteristic determination block 22 may all result in indicia that appear similar in color to the human eye, but have differing spectral characteristics that can be detected by suitable detection equipment. In other embodiments, the various combinations of inks may have different luminescence characteristics that can be detected by suitable detection equipment. An example of such an embodiment is described in the Example set forth below. In still other embodiments, the ink characteristic determination block 22 may operate to cause different portions of an indicia to be printed in different colors. The ink characteristic determination block 22 may select for each portion of the indicia a respective color in which the portion of the indicia is to be printed. The selection of a particular color for a portion of the indicia may be considered to be selection (determination) of an ink characteristic with respect to that portion of the indicia. The respective colors in which the various portions of the indicia are printed may be varied from indicia to indicia under the control of the ink characteristic determination block 22. If the processing and control block 18 and the ink characteristic determination block 22 are implemented with shared hardware, the coupling of the ink characteristic determination block 18 to the processing and control block 18 may be implemented by message passing and/or other interaction between software modules that respectively handle ink characteristic selection and other process and control functions.

The processing and control block 18 may be controlled by the ink characteristic determination block 22 to cause the print element 12 to select inks from the ink sources 16 to print colors or to otherwise provide an ink characteristic or characteristics selected by the ink characteristic determination block 22. Data which indicates a color or colors or other ink characteristic or characteristics selected by the ink characteristic determination block 22 is also an input to the processing and control block 18 from which the processing and control block 18 generates data to be encoded within the indicia. It should also be noted that the processing/control and ink characteristic determination functions, though shown as separate blocks 18, 22, may be substantially or completely integrated with each other.

In other embodiments, the ink characteristic determination block 22 may determine the ink characteristic or characteristics based on data provided from outside of the ink characteristic determination block 22. For example, an ink cartridge 16 may carry a code (e.g., a barcode or an identification code read out by a radio frequency identification (RFID) circuit (not shown) carried on the ink cartridge 16) to identify at least one characteristic of the ink contained in the ink cartridge 16. The code may be read (as indicated by dashed arrow 24) from the ink cartridge 16 by the ink characteristic determination block 22, and corresponding data may be provided from the ink characteristic determination block 22 to the processing and control block 18. In these embodiments, the ink characteristic determination block 22 may include a bar code reader or an RFID reader.

In other embodiments, the ink characteristic determination block 22 may determine the ink characteristic or characteristics by spectroscopically or otherwise optically analyzing a sample indicia or other printed sample.

The print element 12 may be implemented with two or more print elements.

Figure 2:
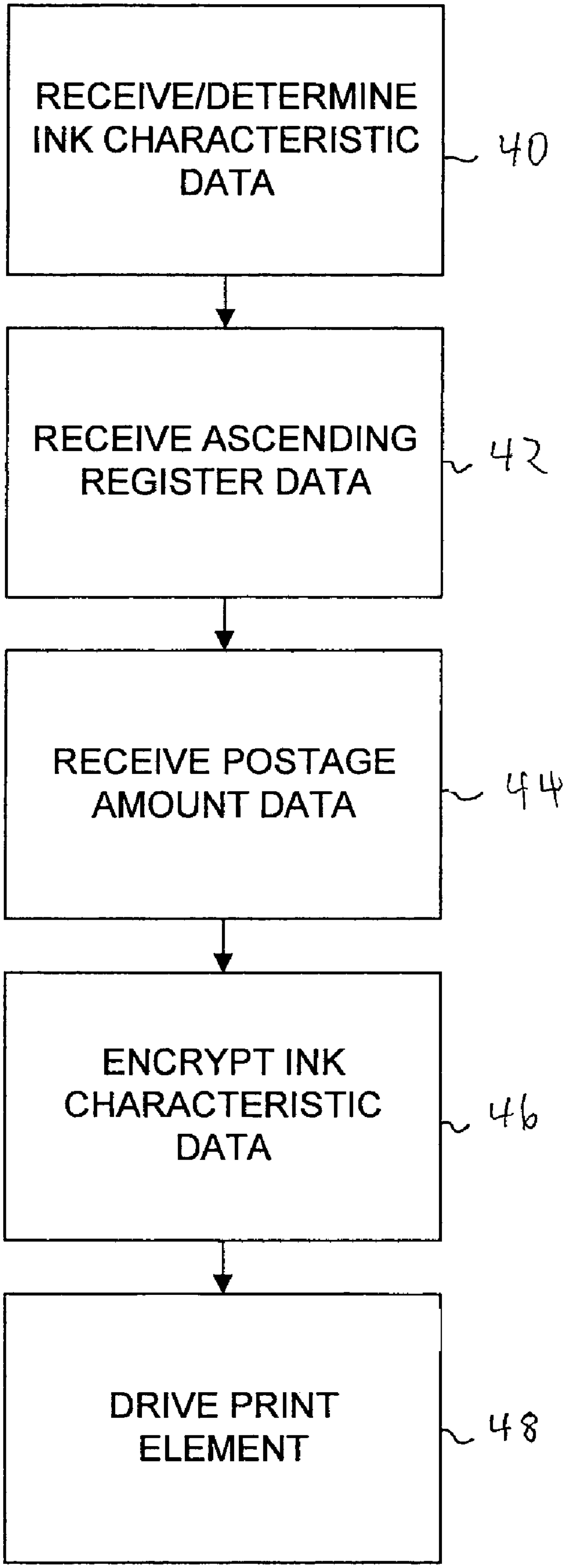
FIG. 2 is a flow chart that illustrates a process that may be performed by a FIG. 3 is a schematic illustration of a postage indicia that may be printed by the apparatus of FIG. 1.

FIG. 2 is a flow chart that illustrates a process that may be performed by a processing and control component or components of the printing apparatus 10.

The process of FIG. 2 begins with a step 40 at which ink characteristic data is received and/or determined. In some embodiments the determination of the ink characteristic data is performed by selecting a color in which an indicia is to be printed or by selecting respective colors in which different portions of the indicia are to be printed. In other embodiments, the determination of the ink characteristic data may entail selection of an ink, or selection of two or more inks to be mixed together, so that the indicia will have certain spectral and/or luminescence characteristics. In embodiments in which a color or colors or other ink characteristics are selected by the ink characteristic determination block 22, a random process may be employed to select the color or colors or other ink characteristics. For example, the ink characteristic determination block may include a random number generator (not separately shown), and on the basis of a random number generated by the random number generator, a look-up table (not separately shown) may be accessed to determine a set of colors to be printed. In still other embodiments, the ink characteristic data is determined by reading (receiving) identifying information carried by an ink cartridge.

Following (or, alternatively, prior to) step 40 is a step 42 at which an ascending register value is received. As is well-known to those who are skilled in the art, an ascending register value is a value that is conventionally stored in a postage meter to indicate the total amount of postage that has been dispensed by the postage meter. The ascending register value may be received, for example, by reading a register that may be maintained in a non-volatile memory (which is not separately shown).

Following one or both of steps 40 and 42 (or alternatively prior to one or both of steps 40 and 42) is a step 44 at which data is received that indicates an amount of postage to be represented by the indicia. The postage amount may be set in a conventional manner, e.g., by manual input or by data received from a postage scale (not shown) that is interfaced to the printing apparatus 10. The receiving of the postage amount data may include, for example, either receiving manual input from a human operator or receiving postage amount data output from a postage scale.

Following steps 4044 is a step 46 at which encrypted data is produced by an encryption process that includes the ink characteristic data, the ascending register data and the postage amount data as inputs and is such that the ink characteristic data, the ascending register data and the postage amount data may be recovered by decrypting the encrypted data.

Step 48 follows step 46. At step 48 the printing apparatus prints a postage indicia. In particular, the processing and control block controls the print element 12 to print the indicia on the substrate 14. As will be seen, the encrypted ink characteristic data is included in the indicia in the form of one or more machine-readable symbols. In embodiments in which the ink characteristic determination block 22 selects a color or colors for the indicia or selects other ink characteristics, the processing and control block 18 controls the print element 12 so that the print element 12 selects and/or mixes inks from the ink sources 16 to print the indicia in accordance with the selection or selections made by the ink characteristic determination block 22. The processing and control block 18 may also control the print element 12 to overprint two or more types of ink or ink mixtures on the same portion of the substrate 14.

Figure 3:
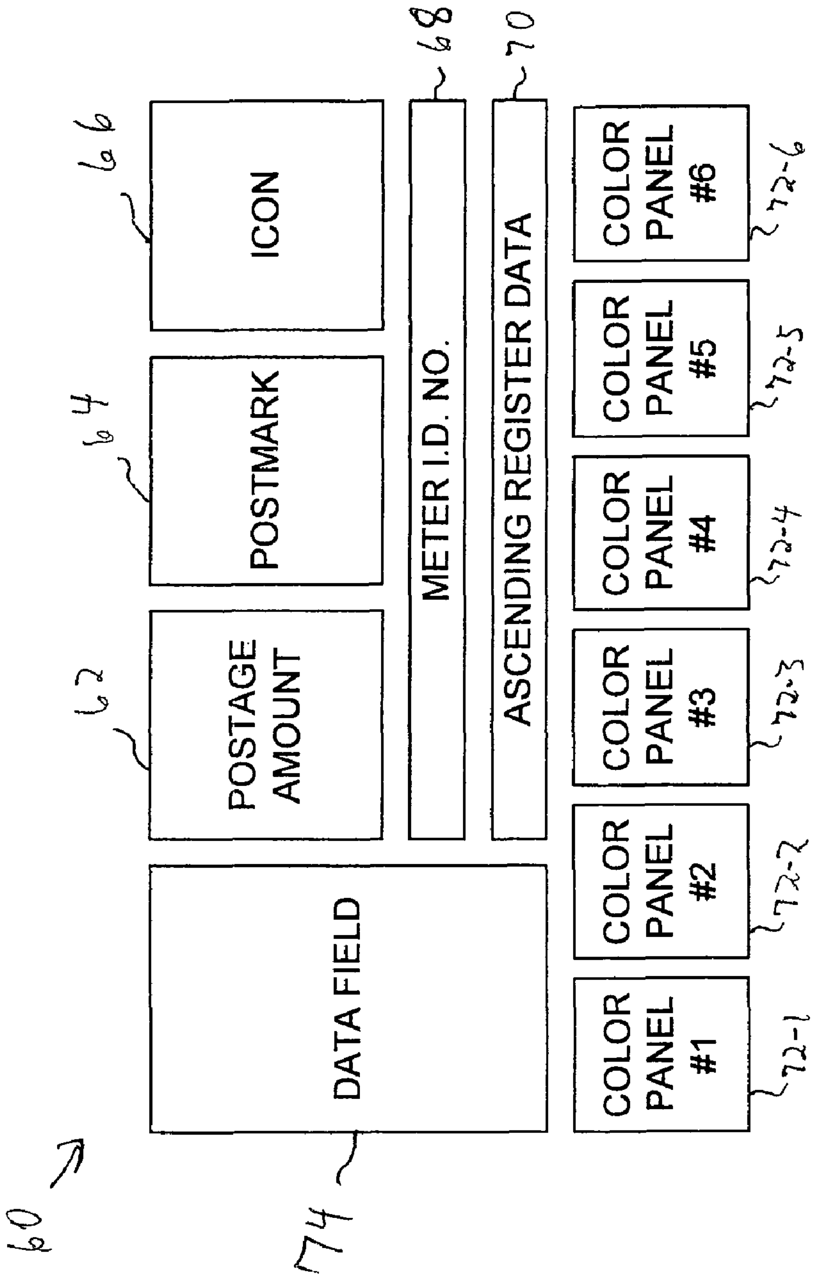

FIG. 3 is a schematic illustration of an example indicia 60 that may be printed by the printing apparatus 10 (FIG. 1) at step 48 (FIG. 2).

Referring to FIG. 3, the indicia 60 may include conventional elements such as a postage amount 62 (in human-readable numerals), a postmark 64 (including date and location of mailing) and a manufacturer's icon, logo or trademark 66. The indicia 60 may further include a meter serial number 68 in the form of human-readable numerals. In addition, the indicia 60 may include an ascending register value 70 in the form of human readable numerals.

In accordance with some embodiments, color panels 72-1 to 72-6 may also be included in the indicia 60. At least some of the color panels 72-1 to 72-6 may differ in color from one or more of the other panels and/or from a color in which other portions of the indicia are printed. In some embodiments, for example, any one of the six color panels 72-1 to 72-6 may be any one of five different colors such as blue, green, yellow, orange and red. The color in which each panel 72 is printed may be varied from indicia to indicia printed by the printing apparatus 10. For each indicia the particular combination of colors to be printed in the panels 72 may be selected by the ink characteristic determination block 22 immediately prior to the printing of the indicia. The selection of the combination of colors may be the result of a random process, as mentioned above. In an embodiment in which six color panels are each printed with any one of five colors, the number of possible combinations exceeds 15,000.

The indicia 60 also includes a data field 74 in which machine-readable data is printed. The data may be presented, for example, in the form of a two-dimensional barcode. The machine-readable data includes the encrypted ink characteristic data that was referred to above in connection with step 46 (FIG. 2). Other data may be included, such as machine-readable versions of the meter serial number and the postmark information and/or destination information such as the destination zip code (e.g., an 11-digit zip code). Some or all of the data field 74 may be printed in accordance with the "Information-Based Indicia Program" (IBIP) promulgated by the U.S. Postal Service. The IBIP information may contain high-density variable cryptographically protected information in a two-dimensional barcode. The IBIP information may be used for security and marketing purposes and may include the encrypted ink characteristic data referred to above. To allow for reliable machine reading of the data field 74, the data field 74 may be printed with black ink or with ink that provides a substantial contrast, e.g. at least 35%, relative to the substrate. In embodiments which provide for variation in the color or colors in which the data field 74 is printed, selection of the color or colors in which the data field 74 is to be printed may be constrained so that the data field 74 always exhibits substantial contrast.

It will be appreciated that the components and/or the layout of the indicia 60 may be changed. For example, the number of color panels 72 may be more or fewer than the six color panels that are shown. Also, the number of colors available for selection by the ink characteristic determination block 22 may be more or fewer than the five colors referred to above. In addition, or alternatively, the colors available for selection may be different from the five specific colors referred to above.

The arrangement of the panels may be changed from the single row shown to, e.g., a single column or to a matrix formed of two or more rows and two or more columns.

In other embodiments, the panels 72 may be partly or completely dispensed with and various other portions of the indicia 60 may be printed in colors that may vary from portion to portion (and from indicia to indicia), and/or the entire indicia 60 may be printed with the same color and/or with the same mixture of ink or with a single ink.

Ink mixtures employed to print indicia may be such that the human-perceived color of the indicias may be unchanged from indicia to indicia, whereas the ink mixtures may vary to provide spectral characteristics that vary from indicia to indicia. Such ink mixtures may be referred to as metameric inks or dyes.

The data field may include machine-readable symbols including barcode and/or printed characters that may be read by optical character reading. The machine-readable symbols include ink characteristic data, as mentioned above, and which may be in encrypted form.

If the ink characteristic data is printed in encrypted form, the encryption process need not include either or both of ascending register data and postage amount data as inputs, and/or may include some or all of other data such as calendar date data, meter serial number data, address data, and so forth.

Figure 4:
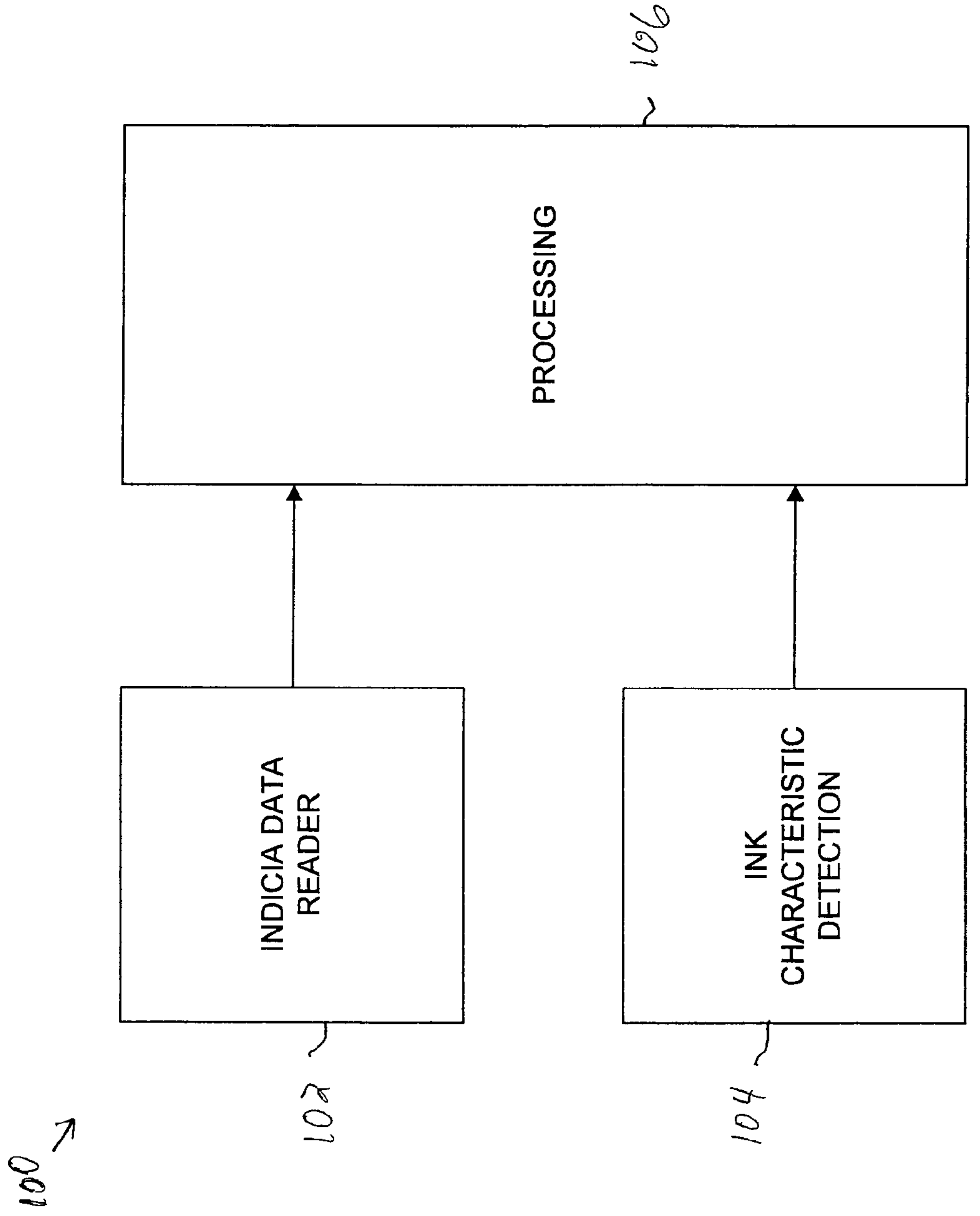
FIG. 4 is a high-level block diagram that illustrates an indicia verification apparatus arranged in accordance with principles of the present invention.

FIG. 4 is a high-level block diagram of an indicia reading and verification apparatus 100 according to principles of the invention.

The indicia reading and verification apparatus 100 includes two front-end modules, namely an indicia data reader 102 and an ink characteristic detection module 104. The indicia reading and verification apparatus 100 also includes a processing module 106 which is coupled to the front-end modules 102, 104 to receive data therefrom. The processing module 106 may include a conventional microprocessor or microcontroller and associated program and working memory, which are not separately shown.

The indicia data reader 102 is able to read data included in printed form in a postage indicia. The data read from the postage indicia by the indicia data reader 102 may be in the form of one or more symbols such as barcode elements or optically readable characters (which may also be standard human-readable characters). The data read by the indicia data reader 102 may be in encrypted form. If the data is encrypted, the indicia data reader 102 may be capable of decrypting the data, or may pass the encrypted data to the processing module 106 for decryption by the processing module 106.

The data read from the indicia by the indicia data reader 102 includes ink characteristic data that indicates one or more characteristics of the ink or inks that were used to print the indicia. The ink characteristic data may include one or more of a color or colors in which the indicia or portions thereof are printed, one or more spectral characteristics of the ink of the indicia, one or more luminescence characteristics (fluorescence and/or phosphorescence characteristic or characteristics), one or more light reflectance, absorbance and/or emission characteristics. The characteristics of the ink may pertain to visible and/or infra-red light, for example.

The ink characteristic detection module 104 operates by spectral analysis, color detection and/or filtering, luminescence detection or other visible or IR radiation detection to detect one or more optical characteristics of the ink or inks employed to print the indicia. The ink characteristic detection module generates ink characteristic data that is indicative of the ink characteristic or characteristics detected by the ink characteristic detection module and provides that data to the processing module 106. In some embodiments, the ink characteristic detection module 104 may include a spectrophotometer or a spectral scanner. In other embodiments the ink characteristic module 104 may include a color analyzer that can analyze and detect respective colors of various portions of the indicia. In still other embodiments, the ink characteristic detection module 104 may include a fluorescence and/or phosphorescence detector such as a fluorometer.

The processing module 106 receives the ink characteristic data provided by the indicia data reader 102 and by the ink characteristic detection module 104. If the data from the indicia data reader 102 is in encrypted form, the processing module 106 decrypts it. The processing module 106 compares the decrypted ink characteristic data from the indicia data reader 102 with the ink characteristic data generated by the ink characteristic detection module 104. If the two ink characteristic data match (i.e., both indicate the same ink or inks were used for the indicia or for the same portions of the indicia), then the processing module 106 may determine that the indicia is verified.

Figure 5:
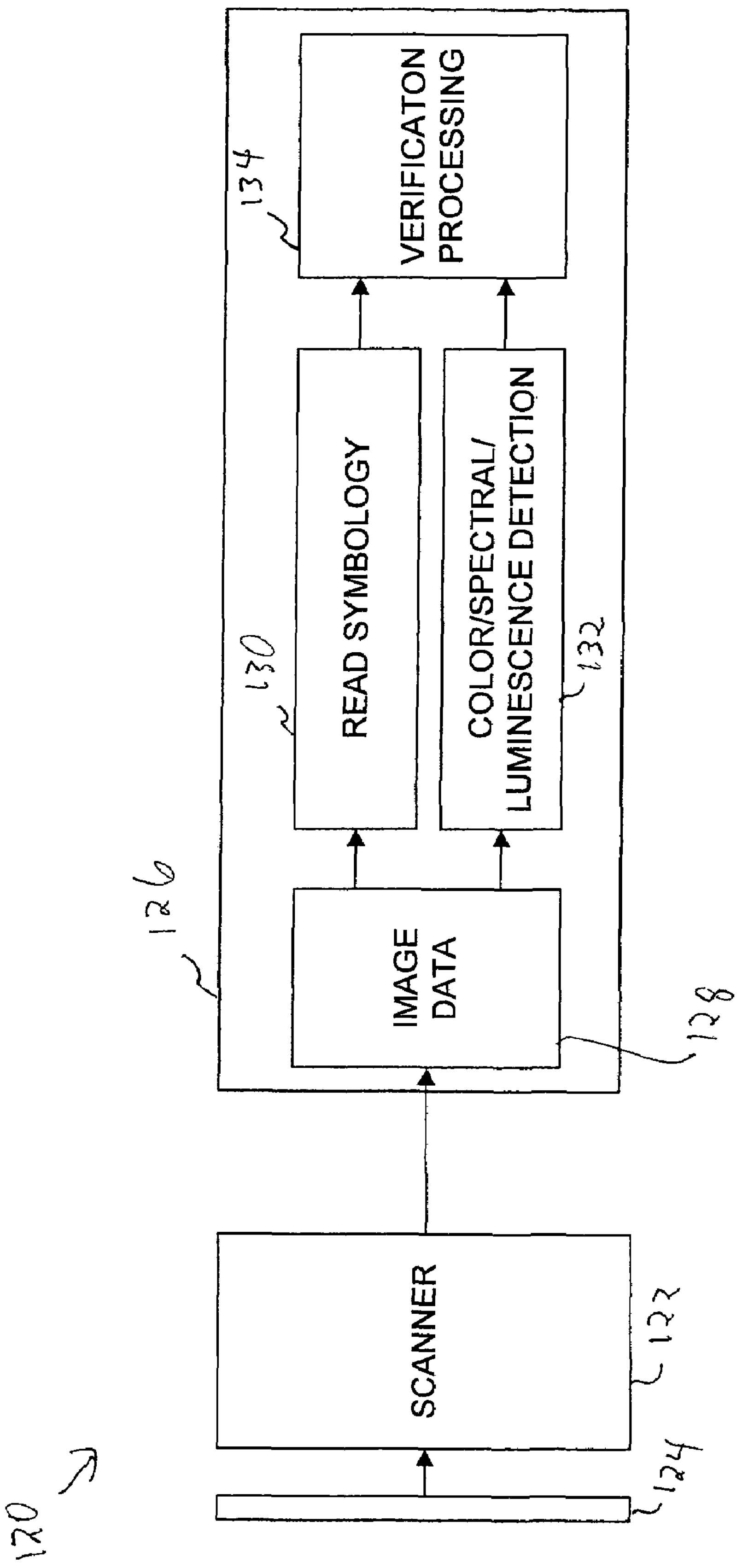
FIG. 5 is a more detailed block diagram that illustrates an embodiment of an indicia verification apparatus arranged in accordance with principles of the present invention.

FIG. 5 is a more detailed block diagram of certain embodiments of an indicia reading and verification apparatus 120 according to principles of the present invention. The indicia reading and verification apparatus 120 may be one example of the indicia reading and verification apparatus 100 shown in FIG. 4.

The apparatus 120 of FIG. 5 includes a scanner 122 that is arranged to scan a mailpiece 124 to capture a color image of an indicia (not separately shown in FIG. 5) from the mailpiece 124. The apparatus 120 also includes an analysis portion 126 which is coupled to the scanner 122 to receive from the scanner 122 image data which is generated by the scanner 122 and represents the image of the indicia. The image data is represented by block 128 in the analysis portion 126. The image data block 128 may comprise, for example, storage and/or preliminary analysis of the image data. The analysis portion 126 includes a symbology reading block 130 and a color or other optical analysis block 132, both of which operate on the color image data of block 128. The analysis portion 126 further includes a verification processing portion block 134 which receives first ink characteristic data from the symbology reading block 130 and second ink characteristic data from the color/optical analysis block 132.

The symbology reading block 130 may disregard any color variations across the indicia and may treat the image data as representing a monochrome image. The symbology reading block 130 may consider only a data field of the indicia.

Operation of the apparatus 120 will now be described with reference to FIG. 6, which is a flow chart that illustrates an indicia reading and verification process performed by the apparatus 120.

Figure 6:
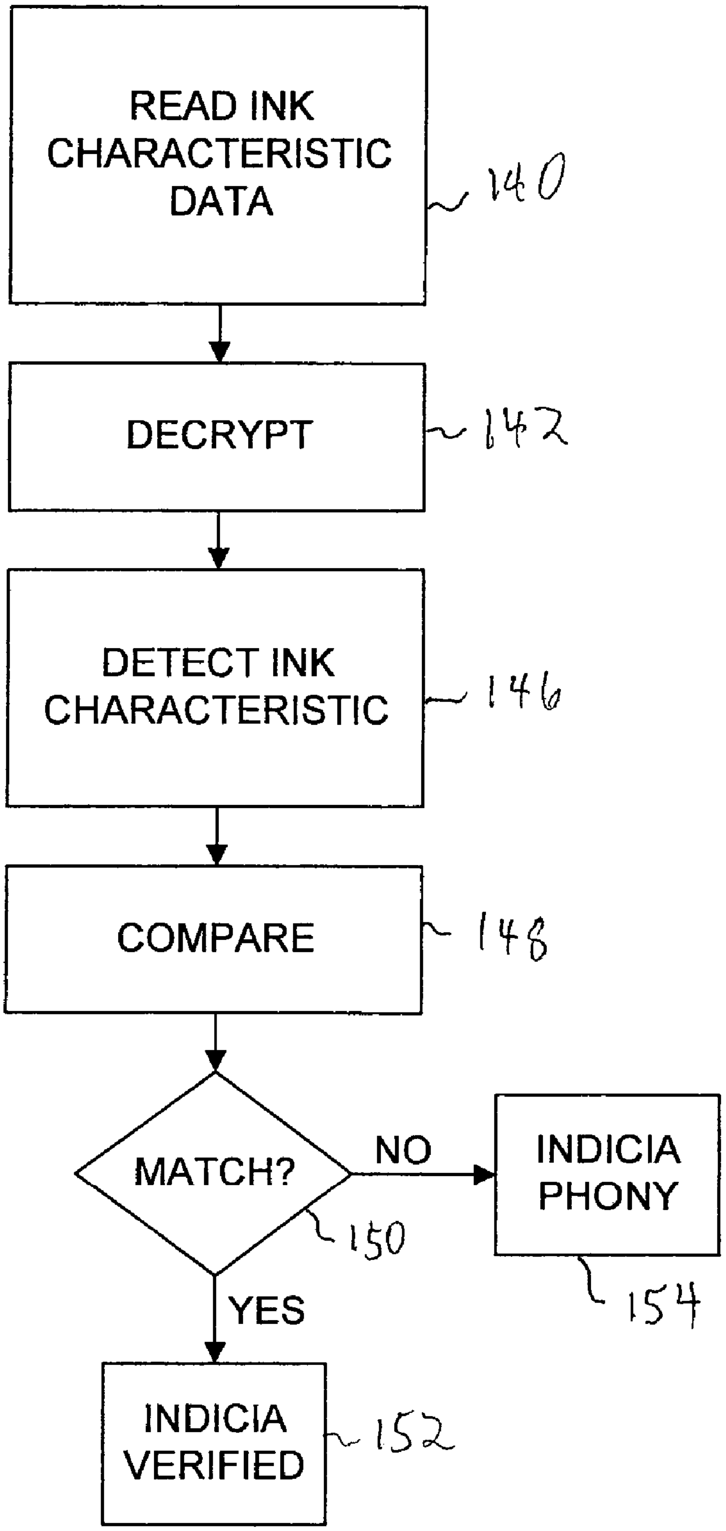
FIG. 6 is a flow chart that illustrates a process that may be performed by the apparatus of FIG. 4 or FIG. 5.

The process of FIG. 6 begins with a step 140 at which the apparatus reads first ink characteristic data from one or more symbols included in the indicia. Next, at step 142, the first ink characteristic data is decrypted. Before, during or after steps 140 and 142, the apparatus 120 detects (step 146) an ink characteristic of the indicia to generate second ink characteristic data. The ink characteristic detected at step 126 may be one or more of a color or colors in which the indicia or portions thereof are printed, one or more spectral characteristics of the ink of the indicia, one or more luminescence characteristics (fluorescence and/or phosphorescence characteristic or characteristics), one or more light reflectance, absorbance and/or emission characteristics. The characteristics of the ink may pertain to visible and/or infra-red light, for example.

Next, at step 148, the first and second ink characteristic data are compared. In some embodiments, the indicia, as shown in FIG. 3, may have panels of varying colors and the color/optical analysis block 132 may detect the respective colors of the panels, such that the combination of colors of the panels is determined to be a combination no. 5397, for example. Moreover, the first ink characteristic data read by the symbology reading block 130 may indicate that data indicating combination no. 5397 was printed in encrypted form in the data field 74 (FIG. 3) of the indicia.

Referring again to FIG. 6, a decision block 150 may follow or form part of step 148. At decision block 150, it is determined whether the first and second ink characteristic data match. If so, the indicia may be considered to be verified (step 152). If the first and second ink characteristic data are determined not to match, the indicia may be found to be counterfeit (step 154).

EXAMPLE

In one proposed embodiment, the postage indicia printing apparatus 10 is arranged to print each indicia in any one of three ink mixtures. Based on a random process, the ink characteristic determination block 22 selects one of the ink mixtures for each indicia. The ink characteristic determination block 22 indicates the selected ink mixture to the processing/control block 18. The processing/control block 18 causes the print element 12 to print an indicia with the selected ink mixture and to include in the indicia encrypted data that indicates the selected ink mixture. The ink mixtures are produced by the print element 12 by mixing various proportions of ink from four ink cartridges. The four ink cartridges may respectively contain black, green fluorescent, blue fluorescent, and red fluorescent ink. The three possible ink mixtures are:

Ink Mixture 1

43% Sun Chemical Jetsperse 3207 (carbon black dispersion; available from Sun Chemical, Cincinnati, Ohio)

22% Sinloihi Invisible Green Fluorescent pigment (available from Sinloihi Co., Ltd., Kanagawa, Japan)

22% Sinloihi Invisible Blue Fluorescent pigment (available from Sinloihi Co., Ltd.)

9.0% ethylene glycol 2.2% Lumilux CD380 Invisible Red Fluorescent dye (available from Honeywell Specialty Chemicals Seetze GmbH, Seetze, Germany)

1.8% triethylene glycol mono n-butyl ether

Ink Mixture 2
44.1% Sun Chemical Jetsperse 3207
11% Sinloihi Invisible Green Fluorescent pigment
33% Sinloihi Invisible Blue Fluorescent pigment
9.0% ethylene glycol
1.1% Lumilux CD380 Invisible Red Fluorescent dye
1.8% triethylene glycol mono n-butyl ether Ink Mixture 3
44.1% Sun Chemical Jetsperse 3207
33% Sinloihi Invisible Green Fluorescent pigment
11% Sinloihi Invisible Blue Fluorescent pigment
9.0% ethylene glycol
1.1% Lumilux CD380 Invisible Red Fluorescent dye
1.8% triethylene glycol mono n-butyl ether The indicia reading and verification apparatus 100 has as part of its ink characteristic detection module 104 a spectrofluorometer like the FluoroMax-2 spectrofluorometer (manufactured by Jobin Yvon Ltd., Stanmore, Middlesex, England). When the indicia are excited with radiation at a wavelength of 254 nm, and read for fluorescence at 434 nm, Ink Mixture 1 produces an intensity reading (photon count) of 30,000, Ink Mixture 2 produces an intensity reading of 40,000, and Ink Mixture 3 produces an intensity reading of 20,000.

The ink characteristic detection module 104 indicates that the indicia is of Ink Mixture 2 if the intensity reading exceeds 35,000. The ink characteristic detection module 104 indicates that the indicia is of Ink Mixture 3 if the intensity reading is below 25,000. The ink characteristic detection module 104 indicates that the indicia is of Ink Mixture 1 if the intensity reading is between 25,000 and 35,000. If the ink mixture data read from the indicia by the indicia data reader 102 corresponds to the indication from the ink characteristic detection module 104, then the processing module 106 finds the indicia to be valid. Otherwise the processing module 106 finds the indicia to be invalid.

With a system as described herein, including printing of ink characteristic data in a postage indicia, and reading the ink characteristic data from the indicia in conjunction with optically and/or spectroscopically detecting an ink characteristic or characteristics from the indicia, verification of postage indicia can be facilitated and automated, and counterfeiting of postage indicia can be more easily detected and deterred. Moreover, with the color and/or ink characteristic based verification of postage indicia, it may be the case that the reading/verification apparatus does not require access to a central database, thereby significantly reducing the cost and increasing the convenience of the counterfeit-prevention system.

In some embodiments, the first and second ink characteristic data need not be obtained via a shared scanner or a shared image data store. For example, symbol reading and ink characteristic detection may proceed in separate channels. The second ink characteristic data may include any ink characteristic data that is not obtained by reading, decoding, and/or decrypting a printed symbol or symbols.

A reader and verification apparatus in accordance with some embodiments may read other data in addition to ink characteristic data from the indicia, and may perform other verification tests in addition to comparing first and second ink characteristic data.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of indicia other than postage indicia. Other variations relating to implementation of the functions described herein can also be implemented. Accordingly, other embodiments are within the scope of the following claims.

What is claimed is:

1. An apparatus comprising:

reading means for reading first ink physical characteristic data from an indicia, the indicia including at least one symbol including ink physical characteristic data that is indicative of the physical characteristic of the ink;

detecting means for detecting at least one ink physical characteristic of the indicia to generate second ink physical characteristic data; wherein the reading and detecting means comprises a single scanner that is shared by the reading means and the detecting means and processing means, coupled to the reading means and to the detecting means, for comparing the second ink physical characteristic data with the first ink physical characteristic data.

2. The apparatus of claim 1, wherein the first ink characteristic data is included in the indicia in encrypted form, and the reading means includes means for decrypting the encrypted first ink characteristic data.

3. The apparatus of claim 1, wherein the at least one ink characteristic detected by the detecting means includes at least one of: (a) a color of at least a portion of the indicia, (b) a spectral characteristic of the indicia, (c) a visible light absorption characteristic of the indicia, (d) a visible light reflectance characteristic of the indicia, (e) an infra-red absorption characteristic of the indicia, (f) an infra-red luminescence characteristic of the indicia, and (g) a visible luminescence characteristic of the indicia.

4. The apparatus of claim 3, wherein the detecting means detects respective colors of a plurality of different portions of the indicia.

5. The apparatus of claim 3, wherein the detecting means detects at least one of:

(a) a spectral characteristic of the indicia, and (b) a luminescence characteristic of the indicia.

6. A method comprising:

reading first ink physical characteristic data from an indicia that is included in the indicia in encrypted form and decrypting the encrypted first ink physical characteristic data;

detecting at least one ink physical characteristic of the indicia to generate second ink physical characteristic data; and comparing the second ink physical characteristic data with the decrypted first ink physical characteristic data to verify the indicia.

7. The method of claim 6, wherein the detecting step includes detecting at least one of: (a) a color of at least a portion of the indicia, (b) a spectral characteristic of the indicia, (c) a visible light absorption characteristic of the indicia, (d) a visible light reflectance characteristic of the indicia, (e) an infra-red absorption characteristic of the indicia, (f) an infra-red luminescence characteristic of the indicia, and (g) a visible luminescence characteristic of the indicia.

8. The method of claim 6, wherein the detecting step includes detecting respective colors of a plurality of different portions of the indicia.

9. The method of claim 6, wherein the detecting step includes detecting at least one of: (a) a spectral characteristic of the indicia, and (b) a luminescence characteristic of the indicia.

10. The method of claim 6, further comprising:

scanning the indicia with a scanner;

and wherein:

the reading step includes analyzing an image signal provided by the scanner; and the detecting step includes analyzing the image signal provided by the scanner.

11. The method of claim 6, wherein the reading step includes reading at least one symbol included in the indicia.

12. A method comprising:

determining a physical characteristic of ink to be applied on a substrate; and applying the ink to the substrate to form an indicia such that the indicia includes at least one symbol, the at least one symbol including ink physical characteristic data that is indicative of at least one spectral characteristic of the ink.

13. The method of claim 12, wherein the ink characteristic data is indicative of a color of the ink.

14. The method of claim 13, wherein the applying step includes forming a plurality of panels of the indicia, and the ink characteristic data is indicative of respective colors of the plurality of panels.

15. The method of claim 14, wherein at least two of the panels are of different colors.

16. The method of claim 12, wherein the ink characteristic data is indicative of at least one luminescence characteristic of the ink.

17. The method of claim 12, wherein the applying step includes printing the ink characteristic data in encrypted form.

* * * * *